(12) United States Patent  
Mochizuki et al.

(10) Patent No.: US 11,820,280 B2  
(45) Date of Patent: Nov. 21, 2023

(54) LAMP SYSTEM

(71) Applicant: KOITO MANUFACTURING CO., LTD., Tokyo (JP)

(72) Inventors: Kiyotaka Mochizuki, Shizuoka (JP); Naoki Tatara, Shizuoka (JP); Norihiko Kobayashi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 292 days.

(21) Appl. No.: 17/212,629

(22) Filed: Mar. 25, 2021

(65) Prior Publication Data

US 2021/0206316 A1 Jul. 8, 2021

Related U.S. Application Data

(63) Continuation of application No. PCT/JP2019/036763, filed on Sep. 19, 2019.

(30) Foreign Application Priority Data

Sep. 28, 2018 (JP) ................................ 2018-185198  
Sep. 28, 2018 (JP) ................................ 2018-185199

(51) Int. Cl.  
*B60Q 1/54* (2006.01)  
*B60K 35/00* (2006.01)  
*B60Q 1/00* (2006.01)  
*B60Q 1/50* (2006.01)

(52) U.S. Cl.  
CPC ............ *B60Q 1/0023* (2013.01); *B60K 35/00* (2013.01); *B60Q 1/50* (2013.01); *B60Q 1/5037* (2022.05); *B60Q 1/54* (2013.01); *B60K 2370/1529* (2019.05); *B60K 2370/178* (2019.05); *B60Q 2400/50* (2013.01)

(58) Field of Classification Search  
CPC ...... B60Q 1/54; B60Q 2400/50; B60K 35/00; B60K 2370/1529; B60K 2370/178  
See application file for complete search history.

(56) References Cited

U.S. PATENT DOCUMENTS 10,960,813 B2 * 3/2021 Imaishi ................. B60Q 1/247  
11,396,262 B2 * 7/2022 Mochizuki ............ B60Q 1/346  
11,584,298 B2 * 2/2023 Takii ..................... G02B 27/01  
(Continued)

FOREIGN PATENT DOCUMENTS

EP 3178698 A1 * 6/2017  
EP 3192698 A1 * 7/2017  
(Continued)

OTHER PUBLICATIONS

Partial Supplementary European Search Report dated Oct. 29, 2021, issued in corresponding European Patent Application No. 19867639.7, 14 pages.  
(Continued)

*Primary Examiner* — Chico A Foxx  
(74) *Attorney, Agent, or Firm* — BUCHANAN INGERSOLL & ROONEY PC

(57) ABSTRACT

A lamp system is mounted on a vehicle provided with a HUD system. A variable light distribution lamp irradiates a beam to a road surface with a variable light intensity distribution so as to draw a pattern. A controller controls the variable light distribution lamp in cooperation with a HUD system.

11 Claims, 10 Drawing Sheets

(56) References Cited

U.S. PATENT DOCUMENTS

| | | | |
|---|---|---|---|
| 11,697,346 B1* | 7/2023 | Weiss | G06T 7/50 |
| | | | 345/589 |
| 2009/0187307 A1* | 7/2009 | Imaeda | B60Q 1/525 |
| | | | 701/36 |
| 2013/0010484 A1* | 1/2013 | Son | B60Q 1/525 |
| | | | 362/464 |
| 2015/0015457 A1* | 1/2015 | Takasu | G02B 27/01 |
| | | | 345/7 |
| 2016/0039334 A1* | 2/2016 | Fleury | B60J 3/04 |
| | | | 315/82 |
| 2016/0257243 A1* | 9/2016 | Son | B60Q 1/50 |
| 2017/0178591 A1* | 6/2017 | Takatsudo | B60R 1/00 |
| 2017/0259731 A1* | 9/2017 | Son | B60Q 1/50 |
| 2017/0337821 A1* | 11/2017 | Masuda | B60Q 1/26 |
| 2018/0244153 A1* | 8/2018 | Ejiri | B60R 1/002 |
| 2019/0026557 A1* | 1/2019 | Watanabe | G06T 1/00 |
| 2019/0051185 A1* | 2/2019 | Masuda | B60Q 1/04 |
| 2020/0018952 A1* | 1/2020 | Lewis | G06T 7/246 |
| 2021/0078484 A1* | 3/2021 | Fujii | B60Q 1/2607 |
| 2021/0162927 A1* | 6/2021 | Takii | G02B 27/0101 |
| 2021/0256933 A1* | 8/2021 | Kurebayashi | B60Q 1/085 |
| 2021/0347259 A1* | 11/2021 | Shibata | B60Q 1/547 |

FOREIGN PATENT DOCUMENTS

| | | | |
|---|---|---|---|
| EP | 3192698 A1 | | 7/2017 |
| EP | 3236447 A4 | * | 5/2018 |
| JP | 2014-013524 A | | 1/2014 |
| JP | 2016-055691 A | | 4/2016 |
| JP | 2018-149856 A | | 9/2018 |
| JP | 2018-149876 A | | 9/2018 |
| JP | 2018149876 A | * | 9/2018 |
| WO | 2017119557 A1 | | 7/2017 |
| WO | WO-2017119557 A1 | * | 7/2017 |

OTHER PUBLICATIONS

Liendernick,"BMW Connected Drive Night Vision with Dynamic Light Spot", XP054982361, Retrieved from the Internet: URL:https://www.youtube.com/watch?v=1No4LkLn Ug, Mar. 23, 2013, 1 page.

International Preliminary Report on Patentability (Form PCT/IB/373) and the Written Opinion of the International Searching Authority (Form PCT/ISA/237) dated Mar. 23, 2021, in corresponding International Application No. PCT/JP2019/036763. (9 pages).

International Search Report (Form PCT/ISA/210) dated Dec. 10, 2019, in corresponding International Application No. PCT/JP2019/036763. (8 pages).

Office Action (Notice of Reasons for Refusal) dated Feb. 7, 2023, in corresponding Japanese Patent Application No. 2020-548597 and English translation of the Office Action. (6 pages).

* cited by examiner

FIG. 2

| | VEHICLE SPEED | | |
|---|---|---|---|
| | 40km/h | 50km/h | 60km/h |
| HUD (MAXIMUM SPEED DISPLAY UNIT) | (40) | (40) | (40) ↕ (40) |
| ROAD SURFACE DRAWING | ╱╲ NOT DISPLAYED | ╱╲ NOT DISPLAYED | ╱40╲ ↕ ╱╲ PTN  DISPLAYED WITH BLINKING |

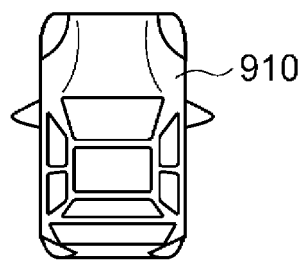
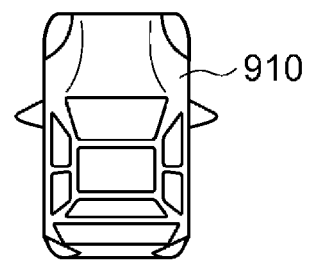

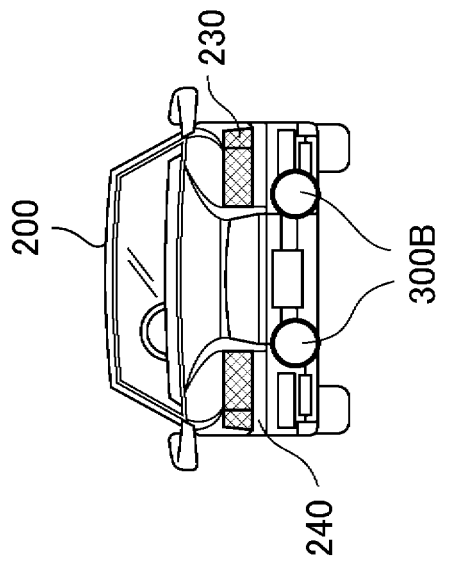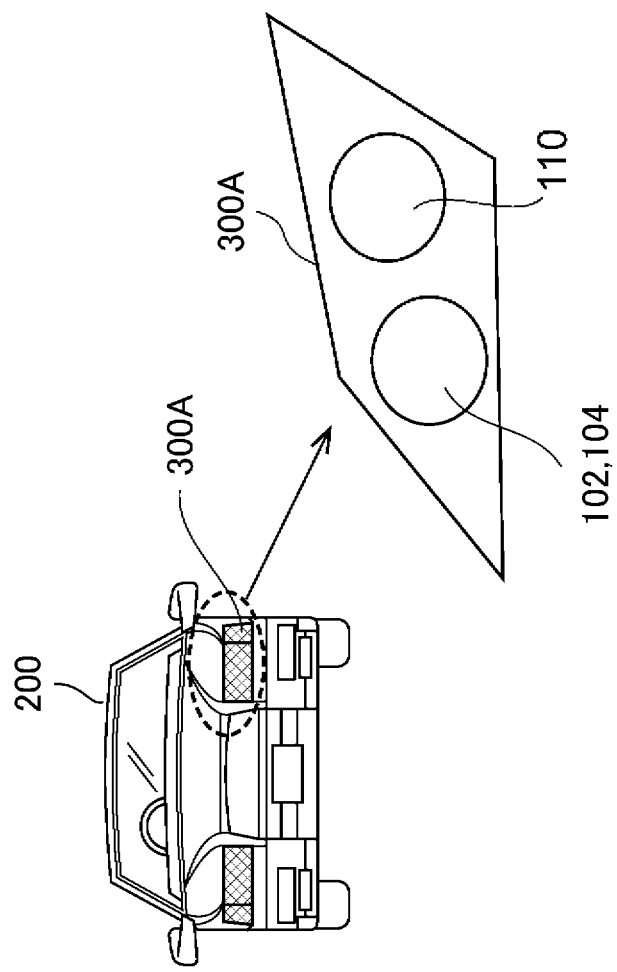

LAMP SYSTEM

BACKGROUND

1. Technical Field

The present disclosure relates to a lamp system.

2. Description of the Related Art

Mounting of a Head-Up Display (HUD) on an automobile has been advancing in order to display information for driving assistance. The HUD displays information such as the speed limit, information associated with a car navigation system, information with respect to the user's vehicle, etc. The HUD is mounted in the line of sight of the driver. This allows the eye movement distance of the driver to be reduced, thereby providing improved safety.

Also, a lamp has been proposed having a function of drawing figures or characters on a road surface so as to present various kinds of information to the driver and surrounding traffic participants.

1. The HUD displays an image at a position nearer than those of objects (vehicles, pedestrians, road signs) in front of the vehicle. Accordingly, for the driver to gaze at the HUD, the driver is required to move the driver's focus. Accordingly, in some cases, the driver does not notice the information displayed on the HUD.

2. In a case in which the HUD display and road surface drawing are executed at the same time, in some cases, the driver views such information in an overlapping form. In this case, it is difficult to transmit accurate information to the driver.

SUMMARY

1. A lamp system according to one aspect is to be mounted on a vehicle provided with a head-up display. The lamp system includes: a variable light distribution lamp structured to irradiate a beam to a road surface with a variable light intensity distribution so as to draw a pattern; and a controller structured to control the variable light distribution lamp in cooperation with the head-up display.

2. A lamp system according to one aspect is to be mounted on a vehicle provided with a head-up display (HUD). The lamp system includes: a variable light distribution lamp structured to irradiate a beam to a road surface with a variable light intensity distribution so as to draw a pattern; and a controller structured to control the variable light distribution lamp. The drawing position on the road surface is settable for each driver.

It should be noted that any combination of the components described above or any manifestation thereof may be mutually substituted between a method, apparatus, system, and so forth, which are also effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 2 is a diagram for explaining the operation of the lamp system;

FIGS. 9A and 9B are diagrams each showing an example configuration of the lamp system.

DETAILED DESCRIPTION OUTLINE OF THE EMBODIMENT

Figure 1:
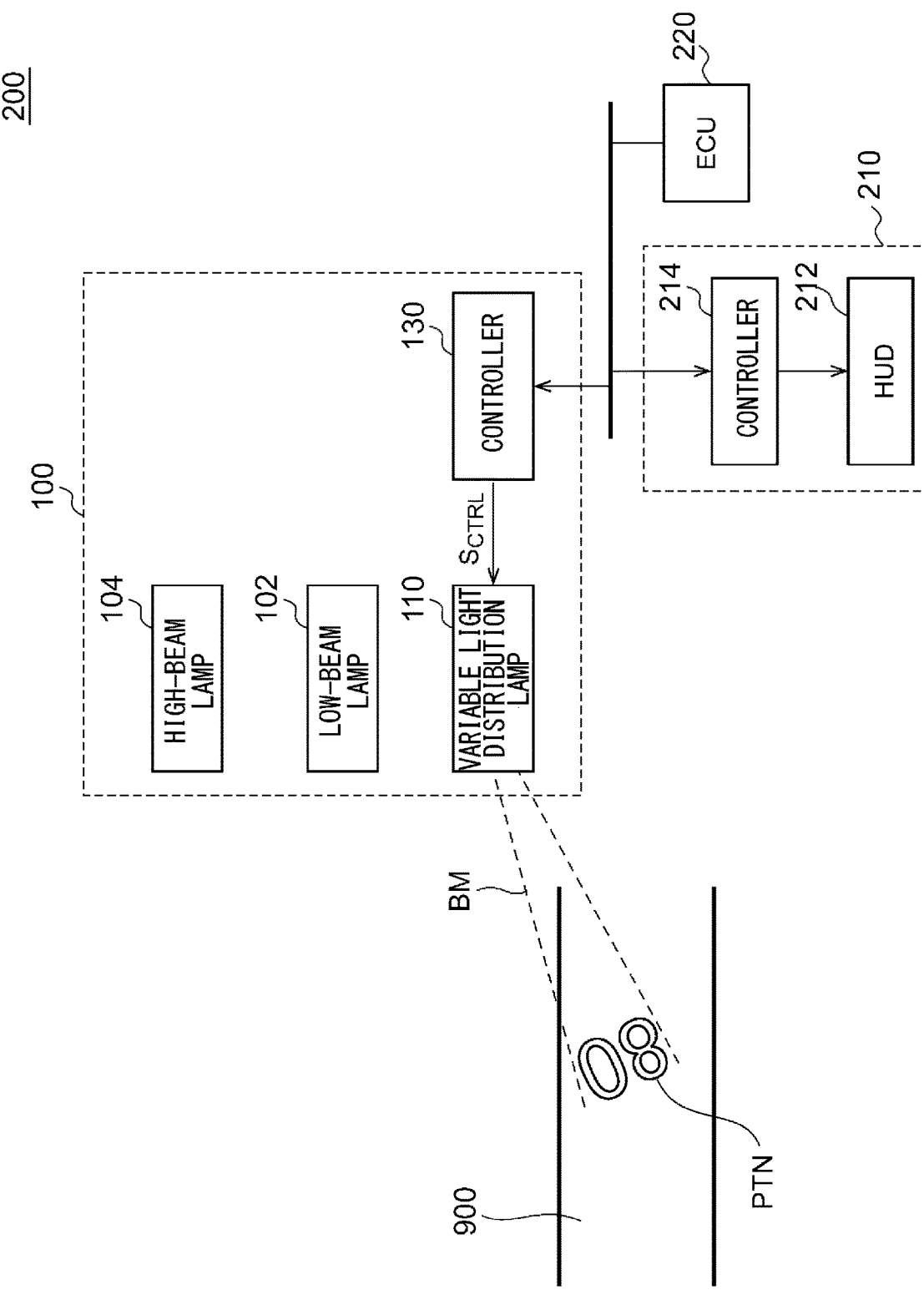
FIG. 1 is a block diagram showing a lamp system according to an embodiment.

An outline of several example embodiments of the disclosure follows. This outline is provided for the convenience of the reader to provide a basic understanding of such embodiments and does not wholly define the breadth of the disclosure. This outline is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "one embodiment" may be used herein to refer to a single embodiment or multiple embodiments of the disclosure.

1. A lamp system according to one embodiment is to be mounted on a vehicle provided with a head-up display. The lamp system includes: a variable light distribution lamp structured to irradiate a beam to a road surface with a variable light intensity distribution so as to draw a pattern; and a controller structured to control the variable light distribution lamp in cooperation with the head-up display.

Such road surface drawing requires an even shorter eye movement distance of the driver than with the head-up display, and a smaller eye focus movement of the driver. With this embodiment, the head-up display and the road surface drawing are performed in cooperation with each other. This allows information to be transmitted to the driver in a sure manner as compared with an arrangement in which the head-up display and the road surface drawing are performed independently.

In one embodiment, when an assumption is made that a driver has not been notified of or has ignored information displayed on the head-up display, the controller may draw the pattern. Instead of an arrangement in which such a pattern is drawn on the road surface at all times in cooperation with the head-up display, such a related pattern is drawn on the road surface only in an essential situation. This arrangement provides such a pattern drawn on the road surface with improved power to caution the driver.

In one embodiment, the pattern may include information in a highlighted manner with respect to information displayed on the head-up display and/or a warning relating to the information displayed on the head-up display.

In one embodiment, in a case in which the head-up display displays a speed limit, when an actual vehicle speed exceeds the speed limit in excess of an allowable range thereof, the controller may draw the pattern on the road surface. The pattern may indicate the speed limit. The head-up display may display the speed limit in a manner in which a non-inverted state and an inverted state are alternately switched.

In one embodiment, the controller may draw the pattern at a position such that it does not overlap the display area of the head-up display as viewed by the driver. Also, the pattern drawing position may be settable independently for each driver.

2. A lamp system according to one embodiment is to be mounted on a vehicle provided with a head-up display (HUD). The lamp system includes: a variable light distribution lamp structured to irradiate a beam to a road surface with a variable light intensity distribution so as to draw a pattern; and a controller structured to control the variable light distribution lamp. The drawing position on the road surface is settable for each driver.

The body height (sitting height) and the seat position vary for each driver. Accordingly, the viewpoint position varies for each driver. Accordingly, by allowing the driver to set the drawing position as desired, this arrangement is capable of preventing overlapping between the HUD and the road surface drawing, thereby transmitting information to the driver with high precision.

In one embodiment, the pattern may include a pattern that reflects the settings for each driver, and a pattern that does not reflect the settings. In a case in which all the patterns are shifted in a single uniform manner, this arrangement has the potential to cause a situation in which it is difficult for the driver to see a particular kind of pattern or a situation in which a particular pattern is presented to the surrounding traffic participants in an inappropriate state. In order to solve such a problem, by classifying the patterns into those that reflect the settings of the driver and those that do not reflect the settings of the driver, this provides both an advantage of allowing the driver to easily see the pattern and an advantage of allowing the surrounding traffic participants to easily see the pattern.

In one embodiment, the first pattern may include first information to be presented to the driver. The second pattern may include second information to be presented to the surrounding traffic participants.

In one embodiment, when the display of the HUD is turned off, the pattern may be drawn without reflecting the settings for each driver. When the HUD is turned off, such an arrangement causes no overlapping between the HUD and the road surface drawing. Accordingly, by disabling the pattern position adjustment, such an arrangement provides improved visibility of the pattern drawn on the road surface as viewed by the driver.

In one embodiment, the settings of the drawing position may be acquired by the driver by moving the reference pattern in a state in which the head-up display displays an image and a reference pattern is drawn on the road surface when the vehicle is parked. This allows the position of the road surface drawing to be set such that it does not overlap the head-up display.

Embodiment

Description will be made below regarding the present disclosure based on preferred embodiments with reference to the drawings. The embodiments have been described for exemplary purposes only, and are by no means intended to restrict the present invention. Also, it is not necessarily essential for the present invention that all the features or a combination thereof be provided as described in the embodiments. The same or similar components, members, and processes shown in the drawings are denoted by the same reference numerals, and redundant description thereof will be omitted as appropriate.

FIG. 1 is a block diagram showing a lamp system (or automotive lamp) 100 according to an embodiment. The lamp system 100 is mounted on a vehicle 200 provided with a Head-Up Display (HUD) system 210.

The HUD system 210 presents information for driving assistance to the driver. Examples of such information include: (i) external information with which the vehicle is to comply; (ii) information associated with a car navigation system; and (iii) information with respect to the user's vehicle. However, such information is not restricted to such examples. Examples of (i) external information include speed limits, vehicle entry prohibitions, stop signs, etc. Such information may be acquired by capturing an image of a road sign by means of a camera. Also, such information may be acquired from a car navigation system. Examples of (ii) information associated with a car navigation system include the course of the vehicle, an intersection at which the vehicle is to turn, the distance up to the intersection, etc. Examples of (iii) information with respect to the user's vehicle include vehicle speed, engine rotational speed, remaining fuel, and various kinds of vehicle warnings.

The HUD system 210 includes a HUD (display main body) 212 and a controller 214 for the HUD 212. The controller 214 instructs the HUD 212 to display appropriate information according to the driving situation.

The lamp system 100 includes a low-beam lamp 102, a high-beam lamp 104, a variable light distribution lamp 110, and a controller 130. Such components may be built into the same housing. Also, several components may be provided as external components of the housing, i.e., may be provided on the vehicle side.

In the present embodiment, the variable light distribution lamp 110 is provided as an additional lamp separately from the low-beam lamp 102 and the high-beam lamp 104. Accordingly, the variable light distribution lamp 110 may be referred to as an "additional beam lamp".

The variable light distribution lamp 110 includes a white light source. The variable light distribution lamp 110 receives, from the controller 130, a control signal $S_{CTRL}$ that indicates a pattern PTN, and irradiates a beam BM having an intensity distribution that corresponds to the pattern PTN to the road surface 900, so as to draw an illuminance distribution (pattern PTN) that corresponds to the control signal $S_{CTRL}$ in front of the vehicle. The configuration of the variable light distribution lamp 110 is not restricted in particular. For example, the variable light distribution lamp 110 may include a semiconductor light source such as a laser diode (LD), a light-emitting diode (LED), or the like, and a lighting circuit configured to drive and turn on the semiconductor light source. In order to form an illuminance distribution corresponding to the pattern PTN, the variable light distribution lamp 110 may include a matrix-type pattern-forming device such as a digital mirror device (DMD), a liquid crystal device, or the like. Also, the variable light distribution lamp 110 may be configured as a light-emitting element array (which will be also referred to as a "μ-LED").

The irradiation area to be provided by the variable light distribution lamp 110 is determined so as to cover at least the road surface 900. Accordingly, the variable light distribution lamp 110 may provide an irradiation area that overlaps a part of the irradiation area provided by the low-beam lamp.

The controller 130 controls the variable light distribution lamp 110. The controller 130 may be configured as a digital processor. For example, the controller 130 may be configured as a combination of a microcontroller including a CPU and a software program. Also, the controller 130 may be configured as a field programmable gate array (FPGA), application specified IC (ASIC), or the like.

More specifically, when the vehicle mounting the lamp system 100 is traveling, the controller 130 controls the variable light distribution lamp 110 so as to draw a figure for driving assistance on the road surface using the beam BM. The kind of the figure is not restricted in particular. For example, the controller 130 may draw a figure that indicates the legal speed information, road signs, or the like, in an easily viewable form for the driver. Also, in order to provide driving assistance to other vehicles, the controller 130 may draw a figure that indicates the traveling direction of the user's vehicle.

The high-beam lamp 104 may be configured to support variable light distribution as with the variable light distribution lamp 110. In this case, the controller 130 may control the light distribution to be provided by the high-beam lamp 104 based on the camera image.

An electronic control unit (ECU) 220 integrally controls the lamp system 100. Specifically, the ECU 220 generates commands such as a turn-on command, turn-off command, etc., for the low-beam lamp 102, the high-beam lamp 104, and the variable light distribution lamp 110. Furthermore, the ECU 220 transmits information required for the light distribution control to the controller 130.

The controller 130 controls the variable light distribution lamp 110 in cooperation with the HUD system 210 so as to draw the pattern PTN on the road surface 900. The pattern PTN includes information to be presented to the driver or other traffic participants, unlike simple illumination such as a low beam.

As shown in FIG. 1, the controller 130 and the HUD system 210 may be coupled via a bus such that they operate directly in cooperation with each other. Alternatively, the controller 130 and the HUD system 210 may be coupled via a processor (ECU) 220 that functions as a host between them such that they operate indirectly in cooperation with each other.

The above is the configuration of the vehicle 200 provided with the lamp system 100. For a driver who gazes in the direction in front of the vehicle while driving, such drawing on the road surface 900 requires an even shorter eye movement distance of the driver than with the HUD, and a smaller eye focus movement of the driver. With the lamp system 100 shown in FIG. 1 configured to execute the road surface drawing in cooperation with the HUD system 210, such an arrangement is capable of transmitting information to the driver in a sure manner.

Next, description will be made regarding cooperation between the lamp system 100 and the HUD system 210.

With an example, when it can be assumed that the driver has not been notified of or has ignored the information displayed on the HUD 212, the controller 130 of the lamp system 100 draws the pattern PTN. Such a situation in which the driver has not been notified of or has ignored the information may be assumed based on the fact that the driver has not taken an action according to the information. In other words, in a situation in which it has been assumed that the driver has been notified of the information, no information relating to the information displayed on the HUD 212 is drawn on the road surface. If such a pattern is drawn on the road surface at all times in cooperation with the HUD, this leads to habituation of such a pattern, resulting in relatively lowering the power to caution the driver. In order to solve such a problem, such a pattern is drawn on the road surface in cooperation with the HUD only in a necessary situation. This allows such a pattern to be drawn on the road surface with improved power to caution the driver.

For example, the controller 214 displays the speed limit on the HUD 212. The speed limit to be displayed may be acquired from a car navigation system, or may be acquired based on a captured image of a road sign. When the vehicle speed is significantly over (or significantly under) the speed limit in a state in which the speed limit is displayed on the HUD 212, it can be said that there is a high probability that the driver has not been notified of the information or has ignored the information.

Specific description will be made based on several examples regarding the road surface drawing supported by the lamp system 100.

Example 1

FIG. 2 is a diagram for explaining the operation of the lamp system 100. Description will be made assuming that the speed limit is 40 km/h. FIG. 2 shows the screens displayed on the HUD and the patterns drawn on the road surface in cases in which the actual vehicle speed is 40 km/h, 50 km/h, and 60 km/h.

The HUD displays a figure (or character string) that indicates the speed limit. When the excess (or shortfall) of the actual vehicle speed with respect to the speed limit becomes larger than an allowable range (assumed to be 20 km/h in this example), the figure that indicates the speed limit is displayed in a highlighted manner. In this example, inverted drawing and non-inverted drawing are alternately repeated.

The pattern to be drawn on the road surface may include information to be drawn in a highlighted manner with respect to the information displayed on the HUD 212 and/or a warning relating to the information displayed on the head-up display. As described above, such information relating to the information displayed on the HUD 212 is not drawn on the road surface at all times. That is to say, when it can be assumed that the driver has been notified of the information (i.e., when the driver complies with the speed limit or when the excess or shortfall of the vehicle speed is within an allowable range), such a pattern relating to the HUD 212 is not drawn on the road surface. In this case, a pattern that has no relation with the HUD 212 (e.g., a pattern for warning a pedestrian) may be drawn on the road surface.

When the excess of the vehicle speed has exceeded an allowable range (when the vehicle speed becomes larger than 60 km/h, in this example), it is assumed that the driver has not been notified of the information or that the driver has ignored the information. In this case, the controller 130 displays a pattern PTN with blinking on the road surface. Such a display with blinking allows the driver to be further cautioned. In a case in which such blinking is executed with a period on the order of 2 to 5 Hz, this effectively cautions the driver. In the example shown in FIG. 2, the pattern PTN that indicates the speed limit is drawn. Instead of such an example, the pattern PTN may include a figure that indicates that the speed limit has been exceeded.

Example 2

Figure 3A:
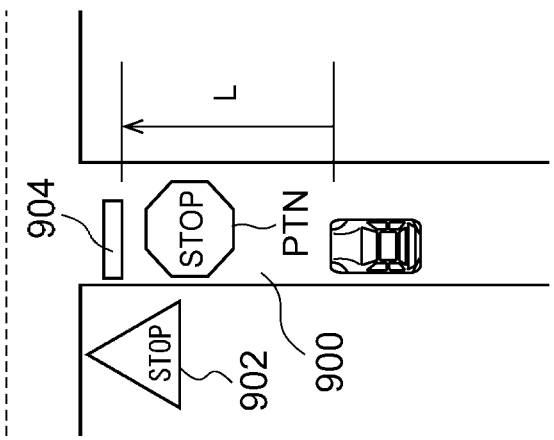
FIGS. 3A through 3C are diagrams for explaining the operation of the lamp system.
Figure 3B:
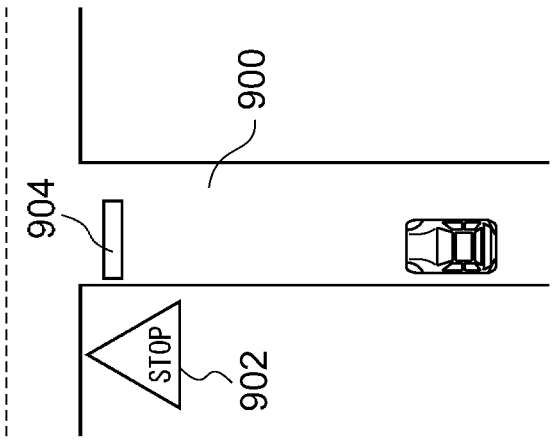
Figure 3C:
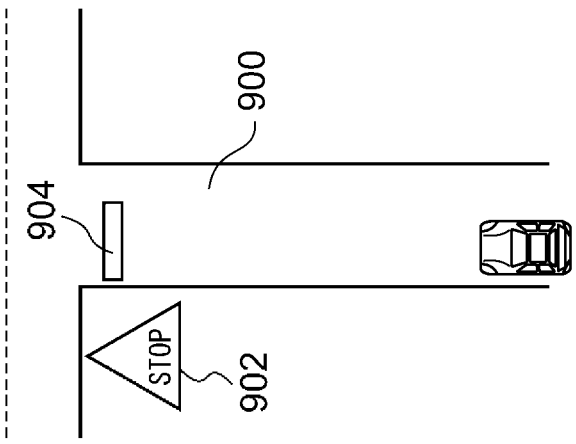

FIGS. 3A through 3C are diagrams for explaining the operation of the lamp system 100. As shown in FIG. 3A, upon detecting a stop sign 902 by means of a camera, the HUD displays a figure that prompts the driver to come to a stop. In this stage, no pattern relating to the stop sign is drawn on the road surface 900.

FIG. 3B shows a situation in which the driver continues to drive the vehicle without noticing the stop sign 902 and the display on the HUD 212.

FIG. 3C shows a situation in which, if the vehicle continues traveling as it is, there is a probability that the vehicle will cross the stop line. In this case, the lamp system 100 draws a predetermined pattern PTN on the road surface 900. In FIG. 3C, the predetermined pattern PTN includes a figure (character string) that indicates the stop sign. For example, when the braking distance becomes longer than the distance L up to the stop line 904, judgment may be made that there is a probability that the vehicle will cross the stop line. Also, the predetermined pattern PTN may be drawn on the satisfaction of a condition that the driver has not operated the brake (the driver has failed to perform a braking operation). Also, the acceleration of the vehicle body may be monitored. With such an arrangement, the predetermined pattern PTN may be drawn on the satisfaction of a condition that the deceleration is insufficient. Also, the predetermined pattern PTN may be drawn on the satisfaction of a simple condition that the distance L up to the stop line becomes smaller than a predetermined threshold value.

Figure 4A:
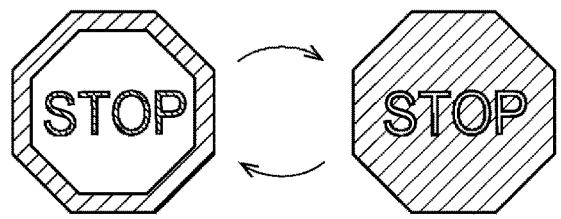
FIGS. 4A and 4B are diagrams each showing an example of drawing of a predetermined pattern.
Figure 4B:
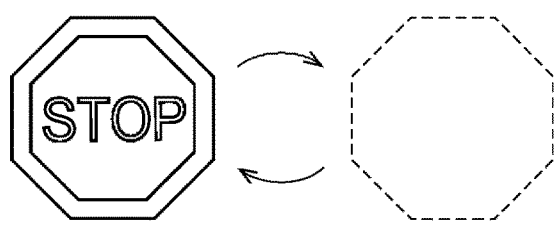

FIGS. 4A and 4B are diagrams each showing an example of the drawing of the predetermined pattern PTN. FIG. 4A shows a situation in which the pattern PTN is drawn with blinking having a predetermined blinking period. Alternatively, as shown in FIG. 4B, the predetermined pattern may be drawn in a white-and-black inversion manner with a predetermined inversion period. This allows the driver to be further cautioned. The white-and-black inversion period may preferably be designed on the order of 2 to 5 Hz.

Position of Road Surface Drawing

Figure 5A:
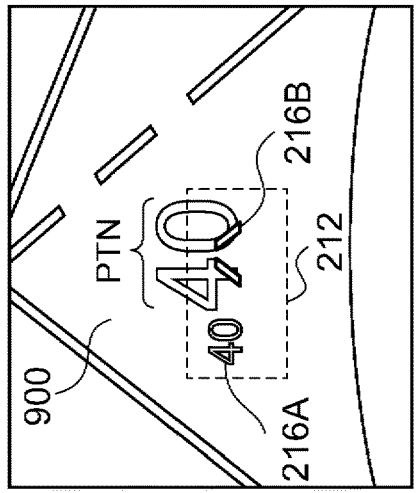
FIGS. 5A through 5C are diagrams for explaining the position of the road surface drawing.
Figure 5B:
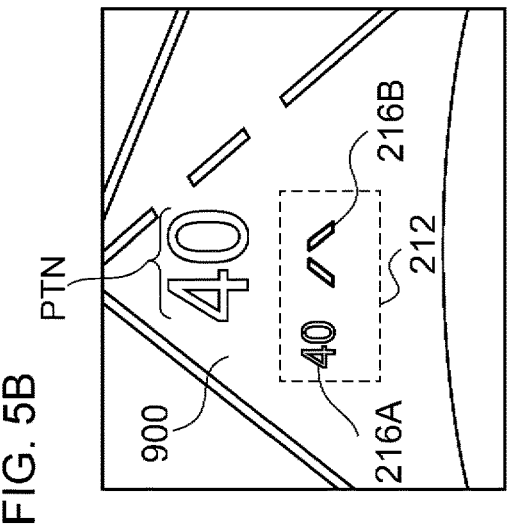
Figure 5C:
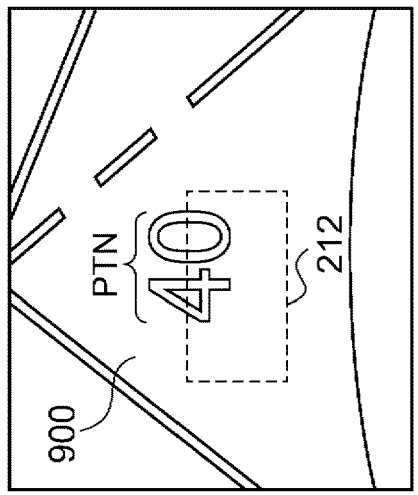

FIGS. 5A through 5C are diagrams for explaining the position of the road surface drawing. FIGS. 5A through 5C each show a field of view of the driver. In this example, the HUD 212 displays speed limit information 216A and lane deviation warning information 216B.

FIG. 5A shows an example in which the pattern PTN is drawn without giving consideration to the HUD 212. In some cases, depending on the position of the viewpoint of the driver, the pattern PTN drawn on the road surface overlaps the display area of the HUD 212. This leads to difficulty in seeing the pattern PTN drawn on the road surface. Furthermore, in this case, it is difficult to see the HUD due to the pattern PTN drawn on the road surface.

In order to solve such a problem, as shown in FIG. 5B, the controller 130 is configured to be capable of adjusting the drawing position of the pattern PTN giving consideration to the HUD. The controller 130 draws the pattern PTN at a position such that it does not overlap the display area of the HUD 212 as viewed by the driver. Specifically, the drawing position of the pattern PTN is shifted toward a farther position in front of the vehicle.

The position relation between the pattern PTN as viewed by the driver and the display area of the HUD 212 is changed according to the viewpoint position of the driver. The viewpoint position of the driver varies according to the body height of the driver, seat position, etc. Accordingly, the controller 130 is configured to adjust the drawing position of the pattern PTN according to the settings of the driver.

In some cases, the HUD 212 is configured to allow the driver to turn on or off the display of the HUD 212 as desired. As shown in FIG. 5C, when the display of the HUD 212 is turned off, the position adjustment function for the pattern PTN drawn on the road surface, which is supported by the controller 130, may be disabled. In this case, the settings of the driver are ignored. That is to say, the pattern PTN may be drawn at a position without position adjustment as with an example shown in FIG. 5A.

The pattern PTN drawn on the road surface includes information to be presented to the driver (which will be referred to as the "first information" hereafter) and information to be presented to other traffic participants (which will be referred to as the "second information" hereafter). A pattern including the first information will be referred to as a "first pattern PTN1". A pattern including the second information will be referred to as a "second pattern PTN2". They will be distinguished as necessary.

The second information does not need to be presented to the driver. Accordingly, it can be said that, even if the second pattern PTN2 overlaps the display area of the HUD 212, such drawing of the second pattern PTN2 has substantially no adverse effect. Alternatively, in some cases, the second pattern PTN2 is drawn in a blind spot of the driver (at a position in front of and in the vicinity of the vehicle). In a case in which the second pattern PTN2 to be drawn in such a blind spot is shifted forward in a single uniform manner according to the settings defined for each driver as with the first pattern PTN1, in some cases, the pattern PTN2 thus shifted enters the field of view of the driver regardless of whether or not it overlaps the display area of the HUD 212, leading to a troublesome situation.

Also, in some cases, the pattern PTN includes a pattern (third pattern PTN3) for indicating a predetermined position (e.g., a position 4 m in front of the vehicle or the like) in a fixed manner with the vehicle as a reference. The third pattern PTN3 is designed such that it remains stationary regardless of the settings of the driver.

With such an arrangement, the kinds of the pattern PTN to be drawn on the road surface are classified into patterns (mainly including the first pattern PTN1) to be subjected to the position adjustment giving consideration to the display area of the HUD and other patterns (mainly including the second pattern PTN2 and the third pattern PTN3). Also, only the former patterns may preferably be subjected to the drawing position adjustment. Also, the drawing position may preferably be fixed for the latter patterns.

Figure 6A:
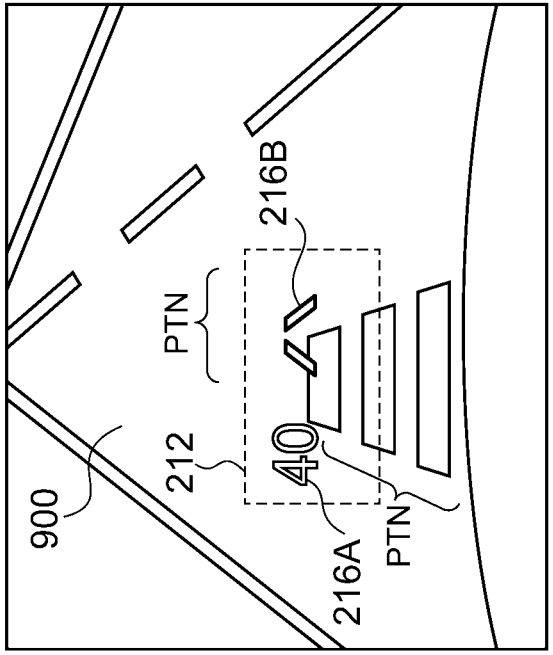
FIGS. 6A and 6B are diagrams for explaining control of the drawing position based on the kind of the pattern.
Figure 6B:
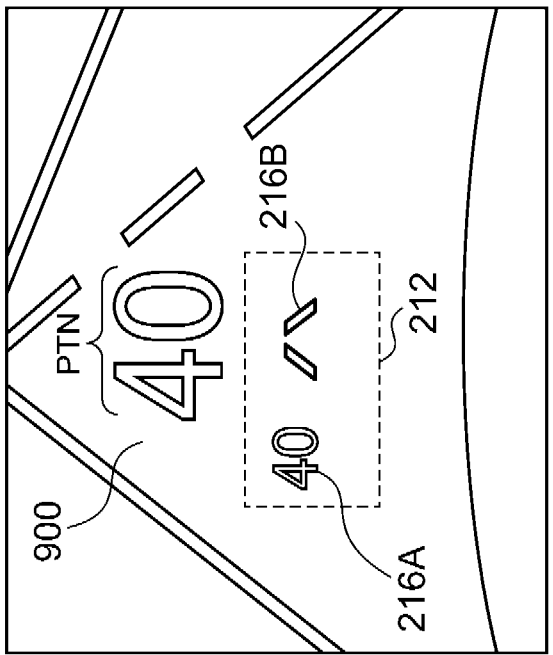

FIGS. 6A, 6B, 7A, and 7B are diagrams for explaining the control of the drawing position based on the kind of the pattern PTN. FIGS. 6A and 6B show the field of view of the driver. In FIG. 6A, as described above, the first pattern PTN1 including the first information to be presented to the driver is drawn on the road surface. The position of the first pattern PTN1 is adjusted such that it does not overlap the display area of the HUD 212.

FIG. 6B shows an example in which the second pattern PTN2 including the second information to be presented to traffic participants other than the driver is drawn on the road surface. In this example, the second pattern PTN2 includes multiple bar patterns arranged in the traveling direction and each extending in the vehicle width direction. The second pattern PTN2 may be configured as a warning to pedestrians. The second pattern PTN2 is not designed to have information for the driver of the vehicle. Accordingly, the second pattern PTN2 may be drawn such that it overlaps the display area of the HUD 212. Accordingly, the second pattern PTN2 is drawn without position adjustment according to the settings of the driver.

Figure 7A:
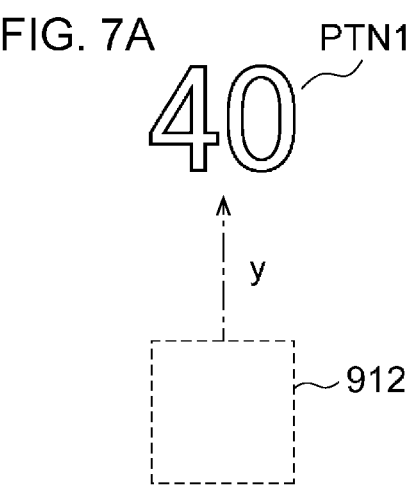
FIGS. 7A and 7B are diagrams for explaining control of the drawing position based on the kind of the pattern.
Figure 7B:
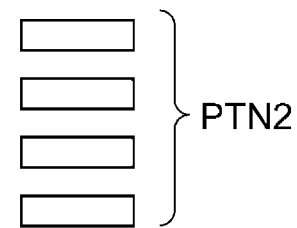

FIGS. 7A and 7B are diagrams each showing the vehicle as viewed from above. The situation shown in FIG. 7A corresponds to the situation shown in FIG. 6A. The pattern PTN1 to be presented to the driver is drawn away from and in front of the user's vehicle 910 so as to avoid overlapping between them. The line of dashes and dots 912 indicates the reference position. The shifted distance y away from the reference position can be adjusted by the driver.

The situation shown in FIG. 7B corresponds to the situation shown in FIG. 6B. There is no need to avoid overlapping between the second pattern PTN2 and the HUD 212. Accordingly, the second pattern PTN2 is drawn at a position nearer to the user's vehicle 910 than the first pattern PTN1. It should be noted that, in some cases, the second pattern PTN2 is drawn substantially farther away from the user's vehicle. As a result, in some cases, the second pattern PTN2 is drawn such that it does not overlap the HUD 212. However, there is no difference between these situations from the viewpoint in which the second pattern PTN2 is drawn without position adjustment based on the settings of the driver.

Figure 8:
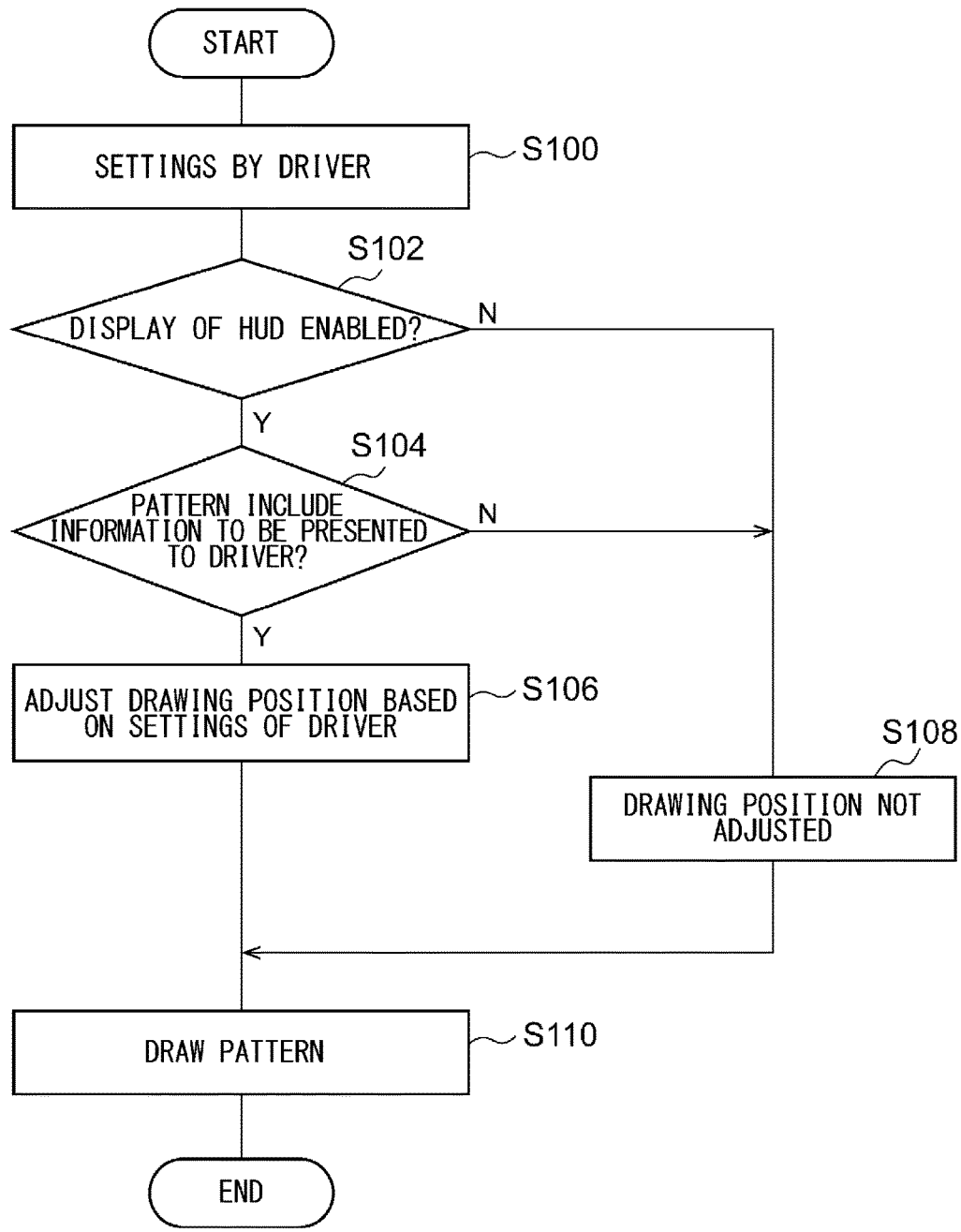
FIG. 8 is a flowchart with respect to control of the pattern drawing position.

FIG. 8 is a flowchart with respect to the control of the pattern drawing position. It should be noted that the flowchart is by no means intended to restrict the execution order of multiple processing steps shown in the flowchart. Rather, the execution order may be switched so long as adverse effects do not occur in the processing. Also, several processing steps may be executed in parallel.

Before the start of traveling, the driver inputs the setting information with respect to the drawing position for the first pattern PTN1 (S100). For example, the vehicle draws a reference pattern for position alignment on the road surface. The driver moves the reference pattern in the front-rear direction (or in the left-right direction) using a user interface so as to shift it to a position such that it does not overlap the display area of the HUD 212, and determines the position of the reference pattern. The position of the reference pattern (or shift amount thereof) in this stage is held by the controller 130 as the setting data.

Next, judgment is made regarding whether or not the display of the HUD 212 is enabled (S102). When judgment has been made that the display of the HUD 212 is disabled (NO in S102), the setting data is ignored, and the drawing position adjustment is not executed (S108).

When judgement has been made that the display of the HUD 212 is enabled (YES in S102), judgment is made regarding whether or not the pattern to be drawn matches the first pattern PTN1 including the first information to be presented to the driver (S104). When judgment has been made that the pattern to be drawn matches the first pattern PTN1 (YES in S104), the drawing position is adjusted based on the setting data acquired in Step S100 (S106). Subsequently, the pattern PTN1 is drawn at the position thus adjusted (S110).

When judgment has been made that the pattern to be drawn matches the second pattern (NO in S104) in the judgment step S104, the drawing position adjustment is not executed (S108). Subsequently, the second pattern PTN2 is drawn on the road surface (S110). The above is an explanation with respect to the drawing position adjustment.

Next, description will be made regarding a configuration example of the lamp system 100. FIGS. 9A and 9B are diagrams each showing an example configuration of the lamp system 100. FIG. 9A shows an example in which the variable light distribution lamp 110 is built into a headlamp 300A together with the low-beam lamp 102 and the high-beam lamp 104.

FIG. 9B shows an example in which the variable light distribution lamp 110 is built into a lamp 300B that is independent of the headlamp 230. The lamp 300B is attached to a bumper 240 arranged on a front side of the vehicle 200, for example.

Figure 10A:
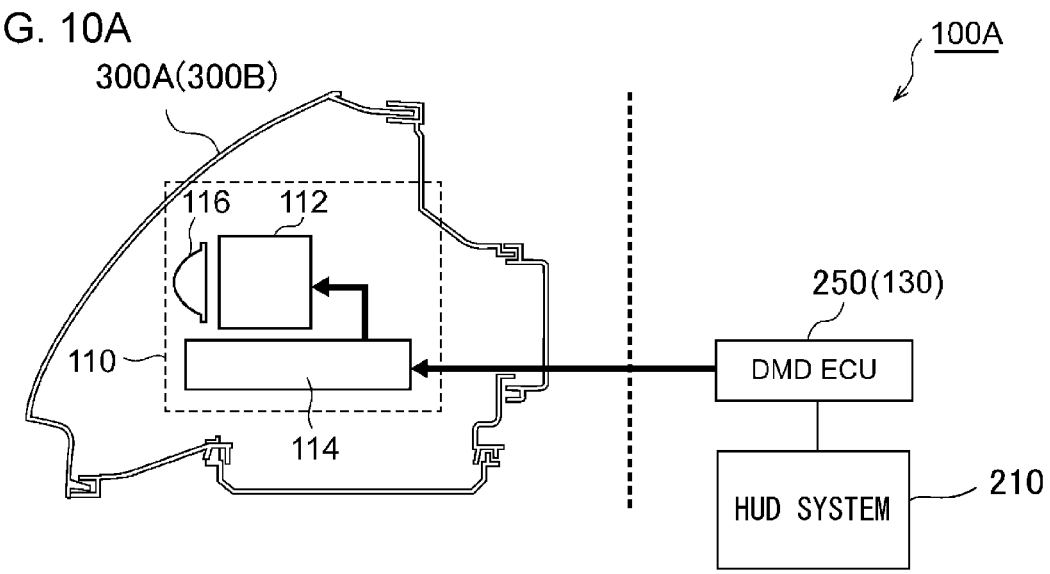
FIGS. 10A and 10B are diagrams each showing an example configuration of a control system of the lamp system.
Figure 10B:
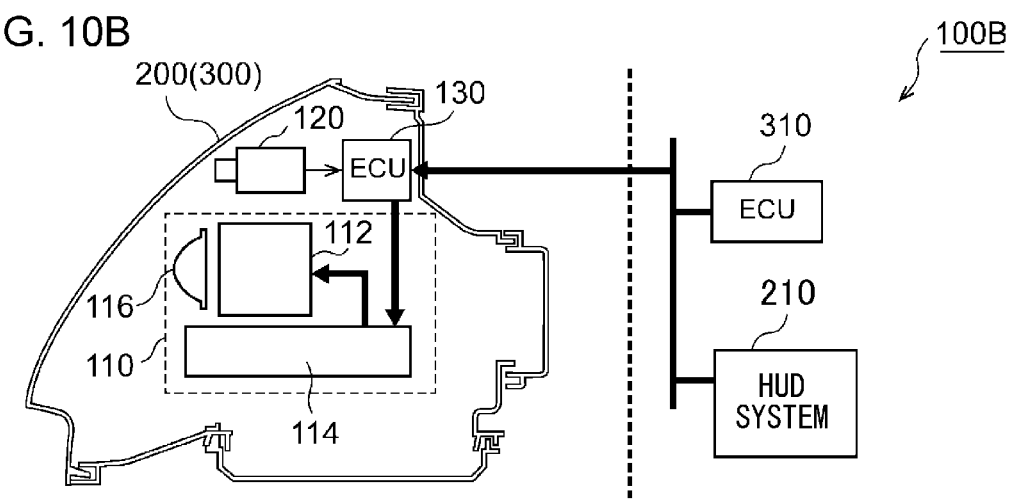

FIGS. 10A and 10B are diagrams each showing a configuration example of a control system of a lamp system. The variable light distribution lamp 110 includes a DMD 112, a driver 114 for the DMD 112, and a projector lens 116. FIG. 10A shows an example in which the light distribution pattern to be provided by the variable light distribution lamp 110 is generated by an ECU 250 arranged on the vehicle side configured as an external component of the lamp 300A (300B). Accordingly, in this example, the functions of the light distribution controller 130 shown in FIG. 1 are supported by the ECU 250. The ECU 250 controls the variable light distribution lamp 110 in cooperation with the HUD system 210 or the ECU 220 shown in FIG. 1.

FIG. 10B shows an example in which the lamp 300A (300B) is provided with a lamp ECU 310. The lamp ECU 310 supports the functions of the controller 130. The lamp ECU 310 controls the variable light distribution lamp 110 in cooperation with the HUD system 210 or the ECU 220.

Description has been made above based on the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

First Modification

The variable light distribution lamp 110 may be built into each of the left and right headlamps 300A or lamps 300B. In this case, the left and right variable light distribution lamps 110 may be configured to provide different irradiation areas. For example, one variable light distribution lamp 110 may irradiate the right half (or upper half) of the irradiation area. Also, the other variable light distribution lamp 110 may irradiate the left half (lower half) of the irradiation area.

Second Modification

Description has been made in the embodiment regarding an arrangement in which the variable light distribution lamp 110 is configured as an additional light source with respect to the low-beam lamp 102 and the high-beam lamp 104. Also, the variable light distribution lamp 110 may integrally support a function of at least one from among the low-beam lamp 102 and the high-beam lamp 104.

Third Modification

The lamp system 100 may support a mode in which the display of the HUD is suspended when the variable light distribution lamp 110 draws a pattern on the road surface. Also, the vehicle may be provided with an interface (e.g., switch) that allows the driver to select such a mode.

Description has been made regarding the present invention with reference to the embodiments using specific terms. However, the above-described embodiments show only an aspect of the mechanisms and applications of the present invention. Rather, various modifications and various changes in the layout can be made without departing from the spirit and scope of the present invention defined in appended claims.

What is claimed is:

1. A lamp system to be mounted on a vehicle provided with a head-up display, comprising: a variable light distribution lamp configured to irradiate a road surface with a beam having a variable light intensity distribution so as to draw a pattern on the road surface; and
    a controller configured to control the variable light distribution lamp in cooperation with the head-up display,
    in a condition in which information to provide driving assistance is displayed on the head-up display and an assumption is made that a driver has not been notified of or has ignored the information displayed on the head-up display, the controller is configured to control the variable light distribution lamp such that the pattern drawn on the road surface relates to the information displayed on the head-up display to further enhance awareness of the driving assistance.

2. The lamp system according to claim 1, wherein the pattern includes information in a highlighted manner with respect to information displayed on the head-up display and/or a warning relating to the information displayed on the head-up display.

3. The lamp system according to claim 1, wherein, in a case in which the head-up display displays a speed limit, when an actual vehicle speed exceeds the speed limit in excess of an allowable range thereof, the controller is configured to draw the pattern on the road surface.

4. The lamp system according to claim 1, wherein, in a case in which the head-up display displays information relating to a stop sign, when there is a probability that the vehicle will cross a stop line if the vehicle continues travelling as it is, the controller is configured to draw the pattern on the road surface.

5. The lamp system according to claim 1, wherein the controller is configured to draw the pattern at a position such that it does not overlap a display area of the head-up display as viewed by the driver.

6. A lamp system to be mounted on a vehicle provided with a head-up display, comprising:
    a variable light distribution lamp configured to irradiate a road surface with a beam having a variable light intensity distribution so as to draw a pattern on the road surface; and
    a controller configured to control the variable light distribution lamp,
    wherein a drawing position of the pattern on the road surface is settable for each driver, and wherein
    when a display of the head-up display is in on-state, the pattern is drawn in a position set for a current driver,
    and when the display of the head-up display is in off-state, the pattern is drawn in a predetermined position regardless of the current driver.

7. The lamp system according to claim 6, wherein the pattern includes a pattern that reflects the settings for each driver, and a pattern that does not reflect the settings.

8. The lamp system according to claim 7, wherein the pattern that reflects the settings for each driver includes first information to be presented to the driver.

9. The lamp system according to claim 7, wherein the pattern that does not reflect the settings for each driver includes second information to be presented to surrounding traffic participants.

10. The lamp system according to claim 7, wherein the pattern that does not reflect the settings for each driver is a pattern to be drawn at a position defined with the vehicle as a reference.

11. A lamp system to be mounted on a vehicle provided with a head-up display, comprising:
    a variable light distribution lamp configured to irradiate a road surface with a beam having a variable light intensity distribution so as to draw a pattern on the road surface; and
    a controller configured to control the variable light distribution lamp,
    wherein a drawing position of the pattern on the road surface is settable for each driver,
    and wherein setting the drawing position includes:
    the head-up display displaying an image and the variable light distribution lamp drawing a reference pattern on the road surface when the vehicle is parked;
    the driver adjusting the drawing position of the reference pattern; and
    storing the adjusted position of the reference pattern as setting data.

* * * * *